April 25, 1967  J. D. KING  3,315,340
PULLER DEVICE FOR REMOVING BRAKE DRUMS OR THE LIKE
Filed Nov. 23, 1964

INVENTOR.
JAMES D. KING
BY Teare, Fetzer & Teare
ATTORNEYS

United States Patent Office 3,315,340
Patented Apr. 25, 1967

3,315,340
PULLER DEVICE FOR REMOVING BRAKE
DRUMS OR THE LIKE
James D. King, 24030 Hackett Drive,
Euclid, Ohio 44123
Filed Nov. 23, 1964, Ser. No. 412,932
4 Claims. (Cl. 29—267)

This invention relates to pulling devices and more particularly relates to an improved puller device for separating a relatively movable member from a relatively stationary member, such as in the pulling of a brake drum from a vehicle shafting or the like.

In general, the present invention provides an improved puller device for removing brake drums or the like from shafting or the like, the device comprises an elongated screw adapted for thrust bearing engagement against a shafting, an apertured spider disposed for axial sliding movement on the screw, a plurality of puller arms pivotally mounted on the spider and adapted for a swinging movement toward and away from the screw and adapted for gripping engagement with a brake drum, and a threaded nut mounted for threaded turning movement on the screw and being disposed below the spider, and a cam member carried by the threaded nut and adapted for camming coacting engagement with the spider upon rotation thereof, and the cam member being pivotally mounted on the threaded nut and disposed eccentrically thereof with respect to the longitudinal central axis of the screw, whereby the spider is moved axially upwardly along the screw upon rotational movement of the cam member for exerting a progressively increased pulling force on the puller arms for removing the brake drum from the shafting.

Heretofore, various types of devices have been employed for pulling and removing parts, such as wheels, axles, gears, cams, bearings and the like, from shafting or other similar equipment. Such devices have usually incorporated various types of screw, screw and nut, toggle-link or similar such mechanism, in order to exert the necessary pulling force on the parts. It has been experienced, however, that such mechanisms are not only expensive to produce, but are not efficient in operation, particularly when utilized in pulling brake drums from vehicle shafting.

Heretofore, it has been a matter of great difficulty to pull a brake drum from its shafting. Such difficulty has arisen primarily from the inability to exert a constant and uniform pulling force on the drum and in a manner to prevent torquing or distortion to the drum. This difficulty has resulted in "sprung" drums which renders it impossible to re-use the drum even after one repair.

Accordingly, an object of the present invention is to provide a simple, yet rugged puller device which can be economically produced and efficiently utilized for exerting a quick and uniform pulling force.

Another object of the present invention is to provide a puller device of the character described having a lever and cam arrangement coacting therewith for applying a quick and uniform force in pulling a brake drum from a vehicle shafting and without torquing or distorting the drum.

A further object of the present invention is to provide a simple, yet rugged lever and cam arrangement which can be quickly and easily adapted, as an attachment tool, to a collapsible puller device for removing an annular member, such as a brake drum, from its shafting.

Other objects and advantages of the invention will be apparent to those skilled in the art and in part pointed out hereinafter in connection with the accompanying drawings wherein there is shown by way of illustration and not of limitation a preferred embodiment of the present invention.

In the drawings, wherein like reference numerals refer to like parts throughout the several views.

Figure 1:
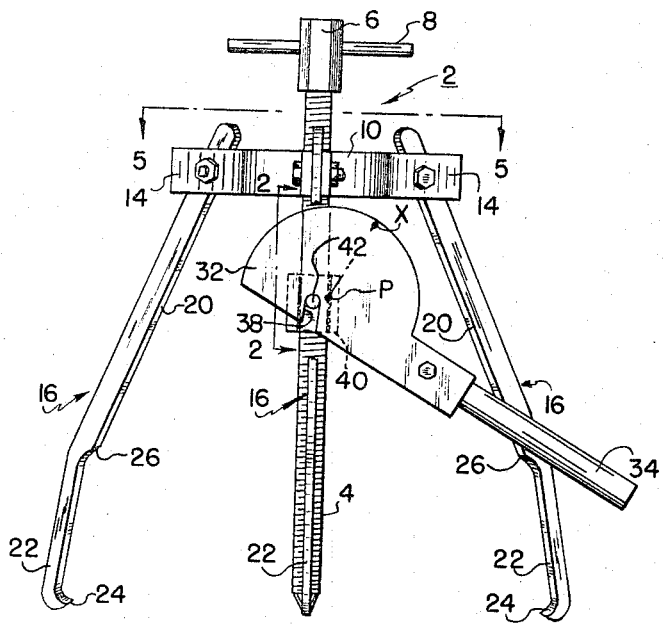
FIG. 1 is a side elevation view of the puller device made in accordance with the present invention.
Figure 2:
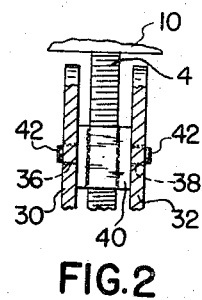
FIG. 2 is an enlarged fragmentary section view taken along the plane indicated by the line 2—2 of FIG. 1.
Figure 3:
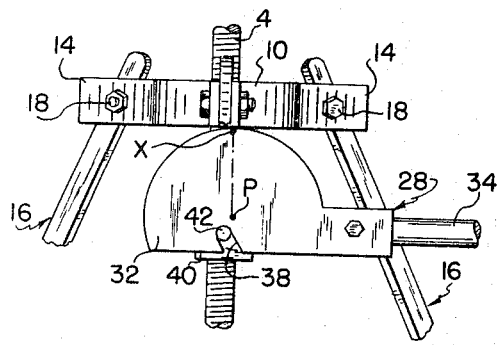
FIG. 3 is an enlarged fragmentary view showing the lever and cam arrangement of the puller device in its maximum "throw" position.

Referring now again to the drawings, the puller device, designated generally at 2, is shown to include an elongated, thrust-screw 4 having a hexagonal tool engaging member 6 disposed at one end thereof. The member 6 may be provided with a turning handle in the form of a removable rod 8 to facilitate rotation of the screw 4.

Movably mounted on the screw 4 is a spider 10 having a centrally disposed bore 12. The bore 12 (FIG. 5) has a slightly greater diameter than the diameter of the screw 4 to enable the latter to be freely, yet snugly slidable relative to the screw 4. The spider 10, in the embodiment shown, includes a plurality of bifurcated ears 14 which extend radially outwardly therefrom. A puller arm 16 is pivotally connected to each of the ears 14, as at 18, for radial swinging movement toward and away from the screw 4. The arms 16 each include inner 20 and outer 22 portions which are bent angularly relative to one another and inwardly relative to the screw 4, so as to exert a maximum gripping and pulling force on the brake drum or similar part.

The desired angular relationship can be achieved by bending the outer portion 22 radially inwardly relative to the inner portion 20 of each of the puller arms 16. It has been found that superior results are achieved when the outer portion 22 is bent between about 10° to 15° relative to the inner portion 20 when the length of the puller arm is approximately 15 inches.

The distal ends of the outer portions 22 of the arms 16 are provided with inturned hooks 24 which constitute jaws for gripping the drum or similar part. The outer portions 22 are preferably recessed, as at 26, between their juncture with the inner portions 20 and the hooks 24 to facilitate gripping and locking of the outer peripheral surface of the drum or similar part. Accordingly, the arms 16 may be dimensionally recessed to accommodate any particular size or share of drum dependent upon the desired application of the device. Similarly, though the device is shown to include three puller arms 16, it is contemplated that other members of puller arms may be utilized, such as two, four, five, etc., in accordance with the present invention.

In accordance with the present invention, the device is provided with a lever and cam assembly, designated generally at 28, which engageably coacts therewith to exert a quick, yet uniform pulling force on the drum or similar part. In the embodiment shown, the assembly includes a pair of laterally spaced, generally semicircular cam plates 30 and 32 which are connected to one end of a handle or lever 34. The cam plates 30, 32 and handle 34 may be fabricated in three parts or may be cast or drop-forged as a unitary structure to maximize the strength and durability characteristics of the assembly. The cam plates 30 and 32 are preferably provided with diametrically opposed, eccentric slots 36 and 38 which are angularly offset from the geometric center P of the plates and for the purposes to be hereinafter described.

The levered cam is removably and pivotally attached to the device by means of a polygonal nut 40. As shown, the nut 40 is threadably mounted for axial movement on the screw 4 immediately below and in spaced relationship relative to the spider 10. The nut 40 is preferably provided with a pair of oppositely disposed, eccentric pintles 42 which extend a predetermined distance laterally outwardly therefrom. The pintles 42 are similarly disposed in offset relationship relative to the geometric center of the nut 40, and are adapted to be slidably received through the corresponding eccentric slots 36 and 38 provided in the cam plate 30 and 32, respectively. Moreover, in the registered position of the pintles 42 within the slots 36 and 38, the center of rotation of the cam plates 30 and 32 on the pintles 42 is disposed so as to be coincident with or lie on the longitudinal central axis of the screw 4.

Figure 4:
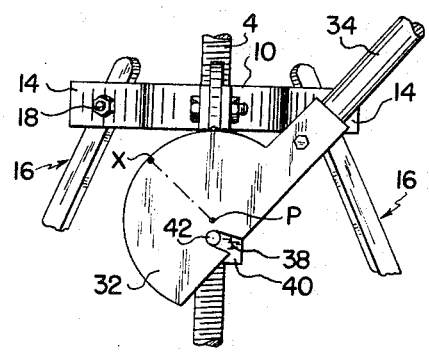
FIG. 4 is an enlarged fragmentary view showing the lever and cam arrangement of the puller device pivoted beyond the maximum "throw" position and in a temporary locked, inoperative position.

By this eccentric disposition of the slots 36 and 38 on the cam plates 30 and 32, and the pintles 42 on the nut 40 there is achieved a maximum displacement or "throw" of the cam plates 30 and 32 against the spider 10 upon actuation of the lever 34. Moreover, as best illustrated in FIG. 4, by pivotal movement of the lever 34 in a clockwise direction, the high points on the cam plates 30 and 32 are simultaneously brought into bearing engagement, as at X, against the confronting undersurface of the spider 10 and at points of contact which lie in a common plane passing through the vertical central axis of the screw 4. Hence, upon pivotal movement of the lever 34 an additional thrust force is exerted upon the screw 4 which is transmitted uniformly to the pulling arms 16 through the spider 10. The additional pulling force transmitted to the arms 16 effectively snaps the drum or similar part from its shafting and in a manner to prevent any torquing or distortion thereto.

Figure 5:
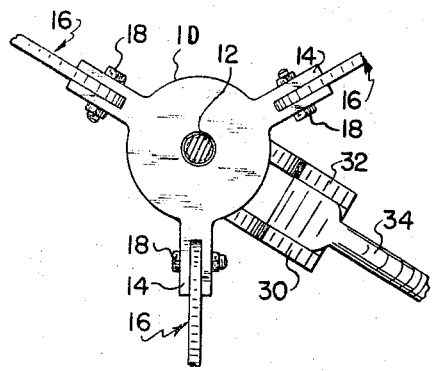
FIG. 5 is a fragmentary top plan view of the puller device of FIG. 1.

In operation of the device and with the levered cam assembly attached to the screw 4, as illustrated in FIG. 1, the puller arms 16 are separated radially so as to accommodate the particular size drum or similar part to which it is to be applied. A few turns may then be given to the handle 8 to rotate the screw 4 until the hooks 24 tightly grip the drum at points uniformly distributed about its periphery. During this movement, the under surface of the spider 10, which is freely movable on the screw 4, is brought to bear against the confronting upper surfaces of the opposed cam plates 30 and 32. The lever 34 may then be pivoted in a counterclockwise direction, as shown by the arrows in FIG. 4, until the lever 34 is disposed in a horizontal or full "throw" position. In this position, a maximum displacement or thrust force is imparted to the spider 10 which force is transmitted to the puller arms 16 for quickly snapping the drum or part from its shafting. Continued movement of the lever 34 rotates the cam plates 30 and 32 beyond their high points X and into an inoperative and locked position against the spindle 10, as shown in FIG. 5. The device can then be quickly released from gripping engagement with the drum simply by pivoting the lever 34 in the opposite or clockwise direction so the device will be ready for another operation, as shown in FIG. 1.

From the foregoing description and accompanying drawings, it will be seen that there is provided a simple and efficient puller device which is self-contained, which lends itself to economic quantity production and which can be operated by relatively unskilled labor with a minimum of effort. It can be seen that by the novel levered cam assembly an additional pulling force can be quickly and uniformly applied to the puller arms and in a manner so that a part, such as a brake drum, can be separated from its shafting without torquing or distortion thereto, thereby enabling the drum to be repeatedly repaired and reused. Furthermore, due to the simplicity of construction, the levered cam assembly may be readily produced as a unitary attachment tool for use with other similar types of pulling devices. Accordingly, though the invention has been described in particular application to the pulling of brake drums, it is to be understood that its principles may also be utilized in pulling and/or separating other types of parts, such as wheels, cams, gears, bearings and the like.

Thus, while there is illustrated herein a preferred embodiment of the invention, it is to be understood that changes and variations may be made by those skilled in the art without departing from the spirit and scope of the appended claims.

I claim:

1. A puller device for separating a relatively movable part from a relatively stationary member comprising, an elongated screw for thrust bearing engagement against said member, a spider having bifurcated ear portions freely mounted for axial sliding movement on said screw, a plurality of puller arms pivotally connected to said ear portions for radial swinging movement toward and away from said screw for gripping engagement with said part, a nut threadably mounted on said screw beneath said spider, a pair of oppositely disposed, eccentric pintles extending laterally outwardly from said nut, a pair of spaced cam plates having oppositely disposed, eccentric slots pivotally mounted by said slots on said pintles, and a lever connected to said cam plates, said cam plates adapted to move said spider axially upwardly along said screw upon pivotal movement of said lever for automatically snapping said part from said member.

2. A puller device in accordance with claim 1, wherein the eccentrically disposed pintles and slots are offset from the longitudinal central axis of said screw so that the high points on said cam plates upon engagement with said spider lie in a common vertical plane passing through the longitudinal central axis of said screw.

3. A puller device for removing brake drums or the like from shafting or the like, such device comprising an elongated screw adapted for thrust bearing engagement with a shafting, an apertured spider disposed for axial sliding movement on the said screw, a plurality of circumferentially spaced puller arms pivotally mounted on said spider for swinging movement through generally vertical planes toward and away from said screw and adapted for gripping engagement with a brake drum, a threaded nut mounted for threaded turning movement on said screw and being disposed below said spider, a cam member carried by said threaded nut and adapted for camming coacting engagement with said spider upon rotation thereof, said cam member being pivotally mounted on said threaded nut, said pivotal mounting being disposed eccentrically with respect to the longitudinal central axis of said screw, whereby said spider is moved axially upwardly along said screw upon rotational movement of said cam member for exerting a progressively increased pulling force on said puller arms for removing said brake drum from said shafting.

4. A puller device in accordance with claim 3, wherein said cam member includes a pair of spaced, oppositely disposed cam plates having aligned oppositely disposed slots therein, said slots being off-set angularly with respect to the longitudinal central axis of said screw, and said threaded nut including a pair of oppositely disposed laterally projecting pintles received in said slots, whereby the high points on said cam plates upon engagement with said spider lie in a common vertical plane which extends through the longitudinal central axis of said screw.

References Cited by the Examiner

UNITED STATES PATENTS

| | | | |
|---|---|---|---|
| 559,803 | 5/1896 | Johnson | 29—262 X |
| 793,710 | 7/1905 | Barnett | 238—191 |
| 864,166 | 8/1907 | Herrick | 269—262 |
| 1,172,761 | 2/1916 | Berkstresser | 29—259 |
| 1,462,437 | 7/1923 | Young | 29—261 |
| 1,999,704 | 4/1935 | Rigney | 220—25 |

FOREIGN PATENTS

| | | |
|---|---|---|
| 775,888 | 10/1934 | France. |
| 370,794 | 4/1937 | Great Britain. |

WILLIAM FELDMAN, *Primary Examiner.*

MYRON C. KRUSE, *Examiner.*